United States Patent
Park

(10) Patent No.: US 7,670,040 B2
(45) Date of Patent: Mar. 2, 2010

(54) LIGHTENING APPARATUS

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 11/603,308

(22) Filed: Nov. 22, 2006

(65) Prior Publication Data

US 2007/0115683 A1    May 24, 2007

(30) Foreign Application Priority Data

Nov. 24, 2005    (KR)    ............... 10-2005-0112830

(51) Int. Cl.
*F21V 7/00*    (2006.01)
(52) U.S. Cl. ............ 362/612; 362/613; 362/227; 362/235; 362/330; 362/329
(58) Field of Classification Search ............ 362/612, 362/608, 610
See application file for complete search history.

(56) References Cited

U.S. PATENT DOCUMENTS

| 4,991,070 | A  | * | 2/1991  | Stob ........................... 362/223 |
| 6,416,196 | B1 | * | 7/2002  | Lemarchand et al. ......... 362/84 |
| 6,527,419 | B1 | * | 3/2003  | Galli .......................... 362/308 |
| 6,595,667 | B1 | * | 7/2003  | Obata ......................... 362/489 |
| 6,979,094 | B1 | * | 12/2005 | Venkatram ................... 362/23 |
| 7,063,450 | B2 | * | 6/2006  | Ehara et al. ................ 362/621 |
| 7,193,248 | B2 | * | 3/2007  | Weindorf et al. ........... 257/100 |
| 2002/0015297 | A1 | * | 2/2002 | Hayashi et al. ............... 362/27 |
| 2007/0291473 | A1 | * | 12/2007 | Traynor ..................... 362/106 |

* cited by examiner

*Primary Examiner*—Anabel M Ton
(74) *Attorney, Agent, or Firm*—Birch, Stewart, Kolasch & Birch, LLP

(57) ABSTRACT

A lightening apparatus includes an LED (Light Emitting Diode) module having a plurality of LEDs and a connection terminal for supplying electric power, a diffusing guide for diffusing light emitted from the LEDs, and a cover in which the diffusing guide is installed and to which the LED module is coupled.

20 Claims, 2 Drawing Sheets

LIGHTENING APPARATUS

BACKGROUND OF THE INVENTION

1. Field of the Invention

The present invention relates to a lightening apparatus using a light emitting diode.

2. Description of the Related Art

As a high luminance white light emitting diode (LED) has been developed, it has replaced a cold cathode fluorescent lamp (CCFL).

Advantages of the LED are that no inverter is required, power consumption is low, and a service life thereof is longer as compared with the CCFL. However, since the brightness of the LED is lower than that of the CCFL, it is difficult to use the LED as a lightening.

SUMMARY OF THE INVENTION

Accordingly, the present invention is related to a lightening apparatus that substantially obviates one or more problems due to limitations and disadvantages of the related art.

The present invention provides a lightening apparatus having a high luminance.

The present invention provides a lightening apparatus that is compatible with a conventional fluorescent lamp.

The present invention provides a lightening apparatus that can be used as a surface light source.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The embodiment of the present invention provides a lightening apparatus including: an LED (Light Emitting Diode) module having a plurality of LEDs and a connection terminal for supplying electric power; a diffusing guide for diffusing light emitted from the LEDs; and a cover in which the diffusing guide is installed and to which the LED module is coupled.

The embodiment of the present invention provides a lightening apparatus comprising: an LED module having LEDs arranged on a first surface and a connection terminal formed on a second surface for supplying electric power to the LEDs; a diffusing guide for diffusing light emitted from the LEDs; and a cover in which the diffusing guide is installed and which has an inner surface on which phosphors are deposited.

The embodiment of the present invention provides a lightening apparatus comprising: an LED module having LEDs arranged on a first surface and a connection terminal formed on a second surface for supplying electric power to the LEDs; a diffusing guide for diffusing light emitted from the LEDs; and a cover in which the diffusing guide is installed and which has an inner surface on which phosphors are deposited and a reflection surface on which a reflection material is coated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
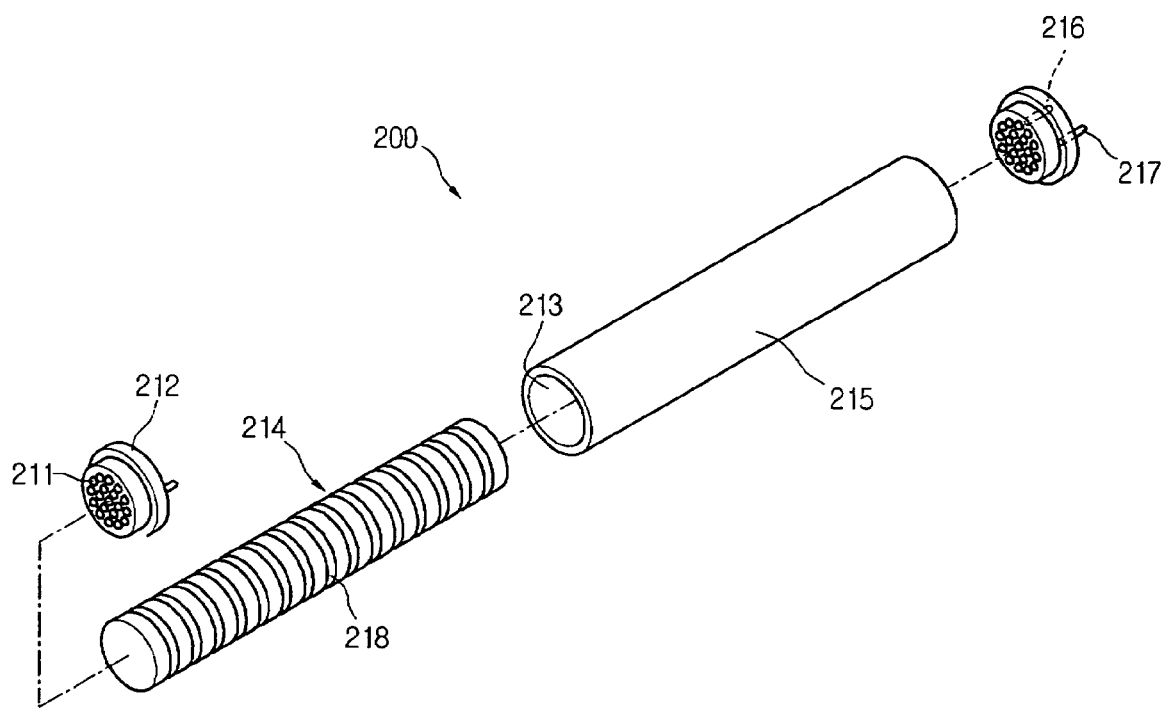
FIG. 1 is a view of a lightening apparatus according to an embodiment of the present invention.

FIG. 1 is a view of a lightening apparatus according to an embodiment of the present invention.

Referring to FIG. 1, a lightening apparatus 200 of an embodiment of the present invention includes an LED module 212 having a plurality of LEDs 211 and connection terminals 216 and 217 for supplying electric power to the LEDs 211, a diffusing guide 214 for diffusing light emitted from the LEDs 211, and a cover 215 in which the diffusing guide 214 is inserted and installed.

The lightening apparatus 200 including the connection terminals 216 and 217 are designed to have a size and shape that can be compatible with the conventional fluorescent lamp.

The diffusing guide 214 may be formed in a cylindrical shape having a diameter of 3-8cm and provided with a U or V-shaped grooves 218 formed in an outer circumferential direction so that the light emitted from the LEDs 211 are refracted and diffused. The grooves 218 formed at a central portion are more densely arranged than at opposite end portions of the diffusing guide 214.

The diffusing guide 214 may be formed of poly methyl methacrylate (PMMA).

The cover 215 is formed in a cylindrical shape having an internal hole 213 to correspond to the shape of the diffusing guide 214. A phosphor material may be deposited on an inner wall of the cover 215. The cover 215 may be formed of glass or plastic. The LED modules 212 are coupled on opposite ends of the cover 215.

In the LED module 212, the LEDs 211 are arranged on a first surface where light can be concentrically illuminated and the connection terminals 216 and 217 protrudes from a second surface to supply electric power to the LEDs 211. The LEDs 211 may be arranged in a packaging type or a chip on board (COB) type.

In addition, the LEDs 211 may be LEDS emitting ultraviolet or blue LEDs.

When the LEDs 211 emit ultraviolet, red, green and blue phosphors may be deposited on the inner wall of the cover 215. When the LEDs 211 are the blue LEDs, yellow phosphors may be deposited on the inner wall of the cover 215.

Alternatively, the LEDs 211 may be LEDs that can emit light with red, green and yellow wavelengths.

In the above-described lightening apparatus 200, the light emitted from the LEDs 211 is refracted by the grooves 218 of the diffusing guide 214 and then emitted to an external side. At this point, an amount and efficiency of the light emitted to the external side may vary according to depths of and distances between the grooves 218 of the diffusing guide 214.

That is, since a relatively large amount of light is introduced from the LEDs 211 to the diffusing guide 214 at an initial incident portion, a distance between the grooves 218 is relatively large. In addition, since a relatively small amount of light is introduced at a central portion of the diffusing guide 214, a distance between the grooves 218 is relatively small to enhance the refraction of the light emitted to the external side.

Furthermore, since the phosphors are coated on the inner wall of the cover 215, the light that is uniformly refracted and emitted from the diffusing guide 214 is emitted to the external side as white light through cover 215.

In this embodiment, a case where the lightening apparatus 200 is a straight type is illustrated as an example. However, the present invention is not limited to this case. That is, the diffusing guide 214 and the cover 215 may be designed in a circular or semi-circular shape.

The following will describe another embodiment of the present invention, in which a lightening apparatus is used as a backlight unit of an LCD or a normal surface light source.

Figure 2:
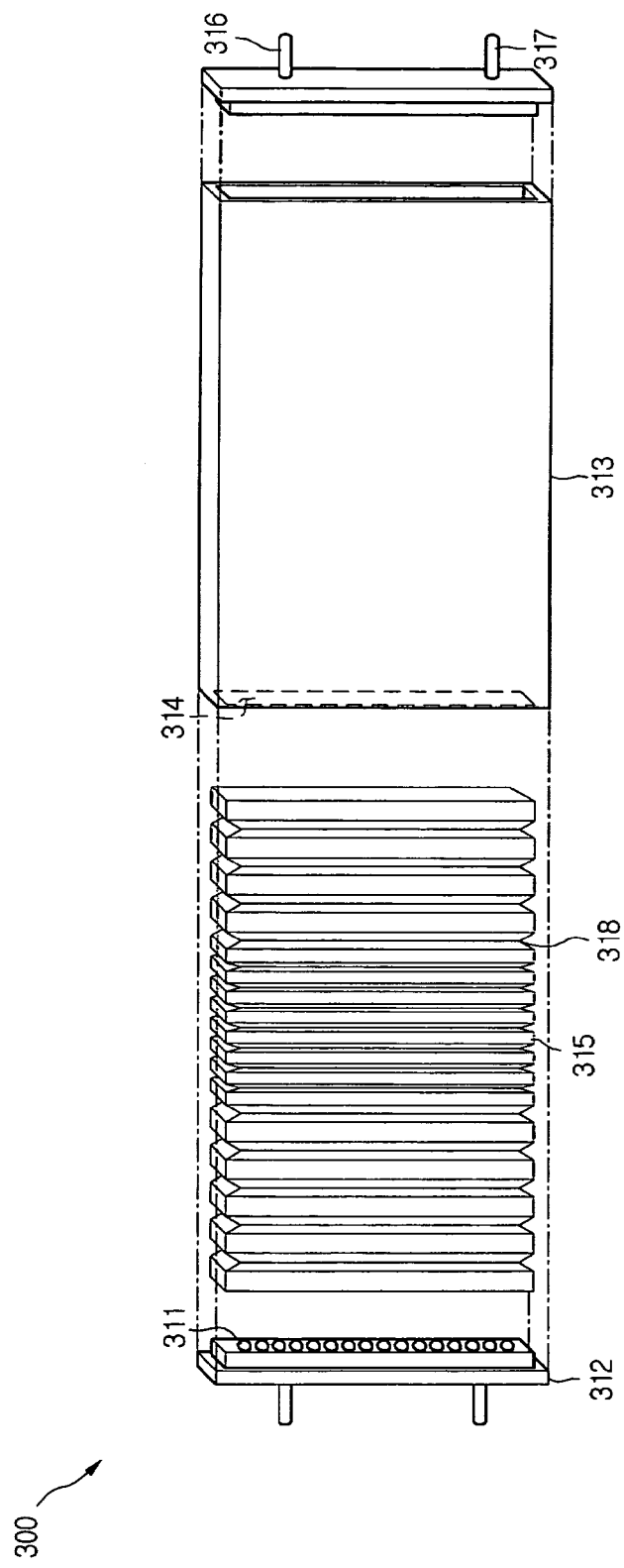
FIG. 2 is a view of a lightening apparatus according to another embodiment of the present invention.

FIG. 2 is a view of a lightening apparatus according to another embodiment of the present invention.

A lightening apparatus 300 includes an LED module 312 having a plurality of LEDs 311 and connection terminals 316 and 317 for supplying electric power to the LEDs 311, a diffusing guide 315 for diffusing light emitted from the LEDs 311, and a cover 313 in which the diffusing guide 315 is inserted and installed. The diffusing guide 315 is formed in a hexahedron shape of a plate shape.

As the LEDs 311, LEDs emitting ultraviolet, LEDs emitting blue light, or LEDs 311 emitting light having red, green and yellow wavelengths can be used.

The LEDs 311 may be arranged in a line or in a matrix pattern.

The diffusing guide 315 may be formed of PMMA and provided at an outer circumference with U or V-shaped grooves 318. The grooves 318 are more densely arranged at a central portion than at opposite end portions of the diffusing guide 315.

The cover 313 may be formed of glass or plastic. The diffusing guide 315 is inserted in a hole 314 of the cover 313 and phosphors may be deposited on a side surface of a hole 314 of the cover 313. The LED modules 312 are coupled to opposite ends of the hole 314.

A reflection layer may be formed on at least one surface of the cover 313 to increase the reflectivity of the light toward a predetermined direction.

In the lightening apparatus 300 of this embodiment, the light generated from the LEDs 311 by electric power applied through the connection terminals 316 and 317 is refracted through the grooves 318 of the diffusing guide 315 and emitted to the external side.

At this point, an amount and efficiency of the light emitted to the external side may vary according to depths of and distances between the grooves 318 of the diffusing guide 315.

That is, since a relatively large amount of light is introduced from the LEDs 311 to the diffusing guide 315 at an initial incident portion, a distance between the grooves 318 is relatively large. In addition, since a relatively small amount of light is introduced at a central portion of the diffusing guide 315, a distance between the grooves 318 is relatively small to enhance the refraction of the light emitted to the external side.

Furthermore, since the phosphors are coated on the inner wall, i.e., an inner surface or a whole inner surface of the hole 314 of the cover 313, the light that is uniformly refracted and emitted from the diffusing guide 315 is emitted to the external side as white light through cover 313.

In the lightening apparatus 300 of this embodiment, the LEDs 311 are provided with surfaces on which phosphors are coated and the light emitted from the LEDs 311 are widely diffused and scattered, thereby improving the light emission efficiency.

Therefore, the lightening apparatus 300 may be used as a backlight unit of an LCD as well as a general lightening.

As described above, the present invention provides a lightening apparatus having a high luminance.

In addition, the present invention provides a surface light source that can be used as the backlight unit of the LCD.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A lightening apparatus comprising:
   a light emitting diode module having a plurality of light emitting diodes and a connection terminal for supplying electric power;
   a diffusing guide for diffusing light emitted from the light emitting diodes; and
   a cover in which the diffusing guide is installed and to which the light emitting diode module is coupled,
   wherein the cover is transparent and the light passes through the cover to an external side.

2. The lightening apparatus according to claim 1, wherein the light emitting diode module comprises a first light emitting diode module and a second light emitting diode module, and the first light emitting diode module and the second light emitting diode module are coupled on opposite ends of the cover.

3. The lightening apparatus according to claim 1, wherein the diffusing guide is provided with a groove and the groove is formed on the outer surface of the diffusing guide so that the light emitted from the diffusing guide are refracted and diffused.

4. The lightening apparatus according to claim 1, wherein the groove is formed in a U or V-shape and the groove is formed in an outer circumferential direction.

5. The lightening apparatus according to claim 1, wherein the diffusing guide is provided with a plurality of grooves, and the grooves are more densely arranged at a central portion of the diffusing guide than at opposite end portions of the diffusing guides, and wherein the central portion of the diffusing guide is at a longer distance from the light emitting diode module than the opposite end portions of the diffusing guides.

6. The lightening apparatus according to claim 1, wherein the diffusing guide is formed of Poly Methyl MethAcrylate.

7. The lightening apparatus according to claim 1, wherein phosphors are deposited on an inner surface of the cover.

8. The lightening apparatus according to claim 1, wherein the diffusing guide is formed in a shape selected from the group consisting of a cylindrical shape, a hexahedron shape, and a plate shape.

9. The lightening apparatus according to claim 1, wherein the light emitting diodes include at least one of red LED, green LED, blue LED and Yellow LED.

10. A lightening apparatus comprising:
- a light emitting diode module having light emitting diodes arranged on a first surface and a connection terminal formed on a second surface for supplying electric power to the light emitting diodes;
- a diffusing guide for diffusing light emitted from the light emitting diodes; and
- a cover in which the diffusing guide is installed and which has an inner surface on which phosphors are deposited,
- wherein the cover is transparent and the light passes through the cover to an external side.

11. The lightening apparatus according to claim 10, wherein the light emitting diode module comprises a first light emitting diode module and a second light emitting diode module, and the first light emitting diode module and the second light emitting diode module are coupled on opposite ends of the cover.

12. The lightening apparatus according to claim 10, wherein the diffusing guide is provided with a groove and the groove is formed on the outer surface of the diffusing guide so that the light emitted from the diffusing guide are refracted and diffused.

13. The lightening apparatus according to claim 12, wherein the groove is formed in a U or V-shape and the groove is formed in an outer circumferential direction.

14. The lightening apparatus according to claim 12, wherein the diffusing guide is provided with a plurality of the grooves the grooves are more densely arranged at a central portion of the diffusing guide than at opposite end portions of the diffusing guides, and wherein the central portion of the diffusing guide is at a longer distance from the light emitting diode module than the opposite end portions of the diffusing guides.

15. The lightening apparatus according to claim 10, wherein the diffusing guide is formed of Poly Methyl Meth-Acrylate.

16. The lightening apparatus according to claim 10, wherein the diffusing guide is formed in a shape selected from the group consisting of a cylindrical shape, a hexahedron shape, and a plate shape.

17. The lightening apparatus according to claim 10, wherein the light emitting diodes emit ultraviolet.

18. The lightening apparatus according to claim 10, wherein the light emitting diodes include at least one of red LED, green LED, blue LED and Yellow LED.

19. A lightening apparatus comprising:
- a light emitting diode module having light emitting diodes arranged on a first surface and a connection terminal formed on a second surface for supplying electric power to the light emitting diodes;
- a diffusing guide for diffusing light emitted from the light emitting diodes; and
- a cover in which the diffusing guide is installed and which has an inner surface on which phosphors are deposited and a reflection surface on which a reflection material is coated,
- wherein the cover is transparent and the light passes through the cover to an external side.

20. The lightening apparatus according to claim 19, wherein the light emitting diode module comprises a first light emitting diode module and a second light emitting diode module, and the first light emitting diode module and the second light emitting diode module are coupled on opposite ends of the cover.

* * * * *